(12) United States Patent
Shimada

(10) Patent No.: US 8,442,781 B2
(45) Date of Patent: May 14, 2013

(54) CORIOLIS FLOWMETER

(75) Inventor: Hideki Shimada, Tokyo (JP)

(73) Assignee: Oval Corporation, Tokyo (JP)

( * ) Notice: Subject to any disclaimer, the term of this patent is extended or adjusted under 35 U.S.C. 154(b) by 270 days.

(21) Appl. No.: 12/746,874

(22) PCT Filed: Jun. 5, 2009

(86) PCT No.: PCT/JP2009/060720
§ 371 (c)(1),
(2), (4) Date: Jul. 7, 2010

(87) PCT Pub. No.: WO2010/058617
PCT Pub. Date: May 27, 2010

(65) Prior Publication Data
US 2010/0268484 A1    Oct. 21, 2010

(30) Foreign Application Priority Data

Nov. 18, 2008  (JP) ................. 2008-294355

(51) Int. Cl.
G01F 1/84  (2006.01)
(52) U.S. Cl.
USPC .......... 702/48; 73/54.01; 73/54.41; 73/861
(58) Field of Classification Search ........... 702/48
See application file for complete search history.

(56) References Cited

U.S. PATENT DOCUMENTS

| | | | |
|---|---|---|---|
| 4,856,321 A * | 8/1989 | Smalling et al. | 73/40.5 A |
| 5,804,742 A | 9/1998 | Rademacher-Dubbick | |
| 6,050,393 A | 4/2000 | Murai et al. | |
| 6,226,598 B1 * | 5/2001 | De Vanssay et al. | 702/48 |
| 6,745,135 B2 * | 6/2004 | Keilty et al. | 702/45 |
| 2001/0045134 A1 | 11/2001 | Henry et al. | |
| 2004/0025599 A1 | 2/2004 | Matt | |

FOREIGN PATENT DOCUMENTS

| | | |
|---|---|---|
| JP | 4-55250 | 2/1992 |
| JP | 6-147949 | 5/1994 |
| JP | 8-170927 | 7/1996 |
| JP | 10-116125 | 5/1998 |
| JP | 2939242 | 8/1999 |
| JP | 2951651 | 9/1999 |
| JP | 2004-509330 | 3/2004 |
| JP | 2007-28355 | 2/2007 |
| JP | 2008-102155 | 5/2008 |
| WO | 02/23137 | 3/2002 |

OTHER PUBLICATIONS

International Search Report issued Aug. 11, 2009 in International (PCT) Application No. PCT/JP2009/060720.

* cited by examiner

Primary Examiner — Sujoy Kundu
Assistant Examiner — Haidong Zhang
(74) Attorney, Agent, or Firm — Wenderoth, Lind & Ponack, L.L.P.

(57) ABSTRACT

A drive device for operating an electromagnetic oscillator includes an OP amplifier for amplifying an analog input signal from an electromagnetic pick-off and an A/D converter for converting an analog signal output from the OP amplifier into a digital signal. The drive device also includes a D/A converter for converting, after digital processing performed by a DSP on the digital signal output from the A/D converter based on phase detection, a digital signal having a processed data amount into an analog signal, and a D/A converter for converting, after the digital processing performed by the DSP on the digital signal output from the D/A converter based on the phase detection, a digital signal having a processed data amount into an analog signal.

8 Claims, 7 Drawing Sheets

CORIOLIS FLOWMETER

TECHNICAL FIELD

The present invention relates to a Coriolis flowmeter which detects a phase difference and/or a vibration frequency proportional to a Coriolis force applied to a tube, to thereby obtain a mass flow rate and/or density of a fluid to be measured.

BACKGROUND ART

The Coriolis flowmeter is a mass flowmeter, which utilizes the fact that, when a tube through which a fluid to be measured flows is supported at one end or both ends thereof, and vibration is applied to a portion of the tube around the supporting point in a direction perpendicular to the flowing direction of the tube, the Coriolis forces applied to the tube (hereinafter, a tube to which vibration is applied is referred to as flow tube) are proportional to a mass flow rate. The Coriolis flowmeter, which is well known, is roughly classified into a straight tube type and a curved tube type in terms of the flow tube shape of the Coriolis flowmeter.

The Coriolis flowmeter is a mass flowmeter for detecting a phase difference signal proportional to a mass flow rate at symmetrical positions between support portions for both ends and a central portion of a measurement tube through which a fluid to be measured flows in a case where the measurement tube is supported at both ends thereof and the central portion of the supported measurement tube is alternately driven in a direction perpendicular to a support line. The phase difference signal is a quantity proportional to the mass flow rate. When a driving frequency is maintained constant, the phase difference signal may be detected as a time difference signal at the observation positions of the measurement tube.

When the alternate driving frequency of the measurement tube is made equal to the natural frequency of the measurement tube, a constant driving frequency corresponding to a density of the fluid to be measured is obtained, and hence the measurement tube may be driven with small driving energy. Therefore, recently, the measurement tube has generally been driven at the natural frequency and the phase difference signal is detected as the time difference signal.

In the straight tube type Coriolis flowmeter, when vibration is applied to a straight tube having both ends supported, in a direction perpendicular to the straight-tube center portion axis, a difference in displacement of the straight tube due to the Coriolis forces is generated between the support portions and the central portion of the straight tube, that is, the phase difference signal is obtained, and, based on this phase difference signal, the mass flow rate is detected. The straight tube type Coriolis flowmeter thus constructed has a simple, compact, and solid structure. On the other hand, there arises a problem in that high detection sensitivity cannot be achieved.

In contrast, the curved tube type Coriolis flowmeter is superior to the straight tube type Coriolis flowmeter in that the curved tube type Coriolis flowmeter allows selection of a shape for effectively obtaining the Coriolis forces. In fact, the curved tube type Coriolis flowmeter is capable of performing mass flow rate detection with high sensitivity. Known examples of the curved tube type Coriolis flowmeter include one including a single flow tube (see, for example, JP 04-55250 B), one including two flow tubes arranged in parallel (see, for example, JP 2939242 B), and one including a single flow tube in a looped state (see, for example, JP 2951651 B).

Incidentally, a combination of a coil and a magnet is generally used as driving means for driving the flow tube. The coil and the magnet are preferably attached to positions which are not offset in the vibration direction of the flow tube because a positional relationship deviation between the coil and the magnet is minimized. Therefore, the two flow tubes arranged in parallel as disclosed in JP 2939242 B are attached so as to sandwich the coil and the magnet. Therefore, the Coriolis flowmeter is designed so that the two opposed flow tubes are separated from each other at least an interval to sandwich the coil and the magnet.

Of Coriolis flowmeters including two flow tubes located in parallel planes, a Coriolis flowmeter having a large diameter or a Coriolis flowmeter having high flow tube rigidity is required to increase power of the driving means, and hence it is necessary to sandwich large driving means between the two flow tubes. Therefore, such a Coriolis flowmeter is designed so that an interval between the flow tubes is necessarily widened even in a fixed end portion which is a base portion of the flow tubes.

As illustrated in FIG. 6, a general Coriolis flowmeter 1 includes a detector 4 and a converter 5 for two U-shaped tubes 2 and 3.

A vibrator 6, velocity sensors 7, and a temperature sensor 8 are attached to the detector 4 for the measurement tubes 2 and 3 and connected to the converter 5.

The converter 5 of the Coriolis flowmeter includes a phase measurement section 11, a temperature measurement section 12, and a drive control section 13.

The phase measurement section 11 is configured as follows.

When digital signal processing is to be executed, the phase measurement 11 of the Coriolis flowmeter performs A/D conversion on signals from the pair of velocity sensors for digital conversion processing, and then obtains a phase difference between the converted signals.

Next, a measurement method used by the temperature measurement section 12 is described.

A temperature sensor for tube temperature compensation is provided in the Coriolis flowmeter.

A resistance type temperature sensor is generally used to measure a resistance value, to thereby calculate a temperature.

The drive control section 13 sends a predetermined mode signal to the vibrator 6 attached to the measurement tubes so as to enable the tubes 2 and 3 to resonance-vibrate.

A conventional analog drive circuit having a positive feedback loop structure is frequently used, in which circuit components are different depending on a tube shape or the like, and hence it is difficult to obtain a common converter structure.

The drive circuit has the structure independent of the phase measurement section 12, and thus cannot control a performance function and is incorporated as a component of measurement means based on the Coriolis force principle (phase measurement). Therefore, the fact is that the drive circuit is not utilized for superior function deployment.

The conventional drive circuit has an analog circuit structure. The conventional drive circuit has a structure as illustrated in FIG. 7.

The operation principle of the drive circuit illustrated in FIG. 7 is described.

An input signal of a pick-off is full-wave rectified by a full-wave rectifier circuit 21 included in an amplitude measurement section 20. The input signal of the pick-off which is full-wave rectified by the full-wave rectifier circuit 21 is input to a low-pass filter 22 included in the amplitude measurement section 20.

In this way, the amplitude measurement section 20 obtains an amplitude value of an input waveform of the input signal of the pick-off which is input to the low-pass filter 22.

The amplitude value obtained by the amplitude measurement section 20 is subtracted by an adder 23 from a reference voltage value Vref input to the adder 23, and then multiplied by a multiplier 24 by the input signal of the pick-off which is input to the amplitude measurement section 20. An input signal obtained by multiplying by the multiplier 24 is input to a drive output amplifier 25, and then output as a drive signal from the drive output amplifier 25.

When the amplitude value of the input signal does not reach a predetermined level, an output of a start circuit 26 is changed to switch a gain of the output amplifier 25. Then, a level of the drive signal increases, and hence the input signal rapidly converges to the predetermined level.

The conventional drive circuit operating as described above has the merit that the response to the change in input signal is excellent because the drive circuit has the analog circuit structure, but has the following demerits.

SUMMARY OF THE INVENTION

The conventional drive circuit has a problem that it is difficult to design a common drive circuit for coupling to various types of sensors based on changed drive parameters because circuit constants are fixed.

The conventional drive circuit has another problem that a cost becomes higher because the number of components included in the circuit is large.

The conventional drive circuit has a further problem that it is necessary to adjust an individual difference of the circuit itself and mount a larger number of components, in order to add a self-diagnostic function of the drive circuit.

It is an object of the present invention to provide a Coriolis flowmeter in which a digital drive circuit is used to adjust an individual difference of the drive circuit itself and drive parameters, to thereby enable a common drive circuit to be designed, the drive circuit to be incorporated in an inner portion of an operator, and a reduction in cost and an addition of a self-diagnostic function to be easily realized.

In order to solve the above-mentioned problems, according to a first aspect of the present invention, there is provided a Coriolis flowmeter having a structure in which a pair of flow tubes constituting measurement tubes are opposed to each other, an electromagnetic oscillator is operated by a driving device to alternately drive the flow tubes in a rotation direction, and an electromagnetic pick-off detects a phase difference and/or a vibration frequency proportional to a Coriolis force acting on the pair of the flow tubes when the pair of the flow tubes are vibrated, to thereby obtain a mass flow rate and/or density of a fluid to be measured, in which the driving device includes:
an OP amplifier for amplifying an analog input signal from the electromagnetic pick-off;
an A/D converter for converting an analog signal output from the OP amplifier into a digital signal; and
a D/A converter for converting, after digital processing performed by a digital signal processor (DSP) on the digital signal output from the A/D converter based on phase detection, a digital signal having a processed data amount into an analog signal.

In order to solve the above-mentioned problems, according to a second aspect of the present invention, there is provided a Coriolis flowmeter in which the digital signal processor (DSP) includes:
an amplitude measurement section for amplitude-calculating, as an amplitude value, a spectral strength at a resonance frequency using an FFT;
a zero-cross calculation section for measuring a number of changes per unit time of a sign bit of digital data input from the A/D converter, and outputting a measured value as zero-cross data;
a drive waveform generation section for generating an output waveform by determining an amplitude of the output waveform based on an output from a PLL and amplitude data from the amplitude measurement section;
a frequency computing section for calculating a frequency based on phase data output from the PLL; and
the phase-locked loop (PLL) for performing the phase detection based on the zero-cross data and output data from the A/D converter.

In order to solve the above-mentioned problems, according to a third aspect of the present invention, there is provided a Coriolis flowmeter in which the phase-locked loop (PLL) generates a drive signal for driving a coil at a transmission frequency synchronized with an input signal based on a transmission frequency obtained by the phase detection and based on the digital signal obtained by A/D-converting the input analog signal from the electromagnetic pick-off.

In order to solve the above-mentioned problems, according to a fourth aspect of the present invention, there is provided a Coriolis flowmeter in which:
the phase-locked loop (PLL) includes:
a multiplier;
a low-pass filter; and
a phase-controlled transmitter;
the multiplier compares a phase of the digital signal output from the A/D converter with a phase of a digital output signal output from the phase-controlled transmitter, and outputs a difference signal and a sum signal therebetween;
the low-pass filter extracts only a low-frequency signal from an output signal from the multiplier; and
the phase-controlled transmitter generates phase data of a fundamental output waveform based on the zero-cross data from the zero-cross section, computes a phase so that output data from the low-pass filter becomes 0, and generates ang outputs a waveform based on the computed phase.

In order to solve the above-mentioned problems, according to a fifth aspect of the present invention, there is provided a Coriolis flowmeter which has a circuit structure in which:
an output signal output from an analog switch is amplified by the OP amplifier connected to an output terminal of the analog switch and output as a drive output signal; and
a gain of the OP amplifier is switched by the analog switch.

According to the above-mentioned claims of the present invention, the individual difference of the drive circuit itself and the drive parameters are adjusted, to thereby enable a common drive circuit to be designed, the drive circuit to be incorporated in the inner portion of the operator, and the reduction in cost and the addition of the self-diagnostic function to be easily realized.

DETAILED DESCRIPTION OF THE INVENTION

When a digital drive circuit is used, an important point is how much a high-speed response of an analog circuit is duplicated by the digital drive circuit. This may be solved when a high-speed driven computing unit is used. However, a cost of the high-speed driven computing unit is very high, and hence a new problem that the possibility is too limited occurs.

Therefore, the inventors of the present invention realized the drive circuit using a driving method based on a concept of a phase-locked loop (PLL). The phase-locked loop (PLL) is an electronic circuit for outputting a signal which is equal in frequency to and synchronized in phase with an input alternating current signal from another oscillator by feedback control.

As described above, the PLL is originally a circuit for phase synchronization and may produce a signal synchronized in phase with an input signal.

The PLL is relatively easily composed of a computing unit and can perform high-speed computation, and hence it can be expected to suppress an increase in computation load which is caused by adding the drive circuit to the computing unit.

Hereinafter, a best mode for carrying out the present invention is described with reference to the attached drawings.

Figure 1:
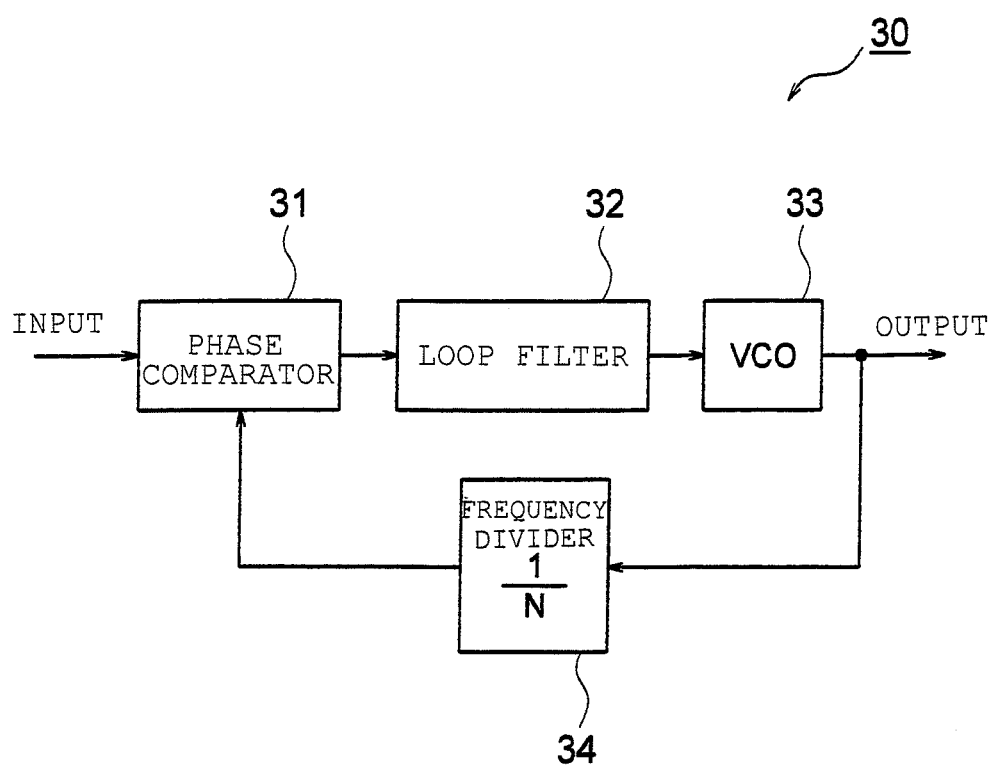
FIG. 1 is a structural diagram illustrating a phase-locked loop (PLL).

FIG. 1 is a circuit structural diagram illustrating a phase-locked loop (PLL) 30.

The phase-locked loop (PLL) is an oscillation circuit for performing feedback control for oscillation on an oscillator provided in the loop so that a phase difference between a reference signal input from the outside and an output of the oscillator provided in the loop is maintained constant.

The PLL 30 illustrated in FIG. 1 includes a phase comparator 31, a loop filter 32, a voltage control oscillator (VCO) 33, and a frequency divider 34.

The PLL 30 illustrated in FIG. 1 is an electronic circuit for outputting a signal which is equal in frequency to and synchronized in phase with an input alternating current signal from another oscillator by feedback control.

In the PLL 30, a phase difference between an input (reference frequency) and an output signal of the voltage control oscillator (VCO) 33 which has a frequency which changes depending on a voltage is fed back to the VCO 33 for synchronization. In this case, when a divided frequency of the output signal of the voltage control oscillator (VCO) 33 is used, a signal obtained by multiplying the frequency of the input signal may be produced.

Figure 2:
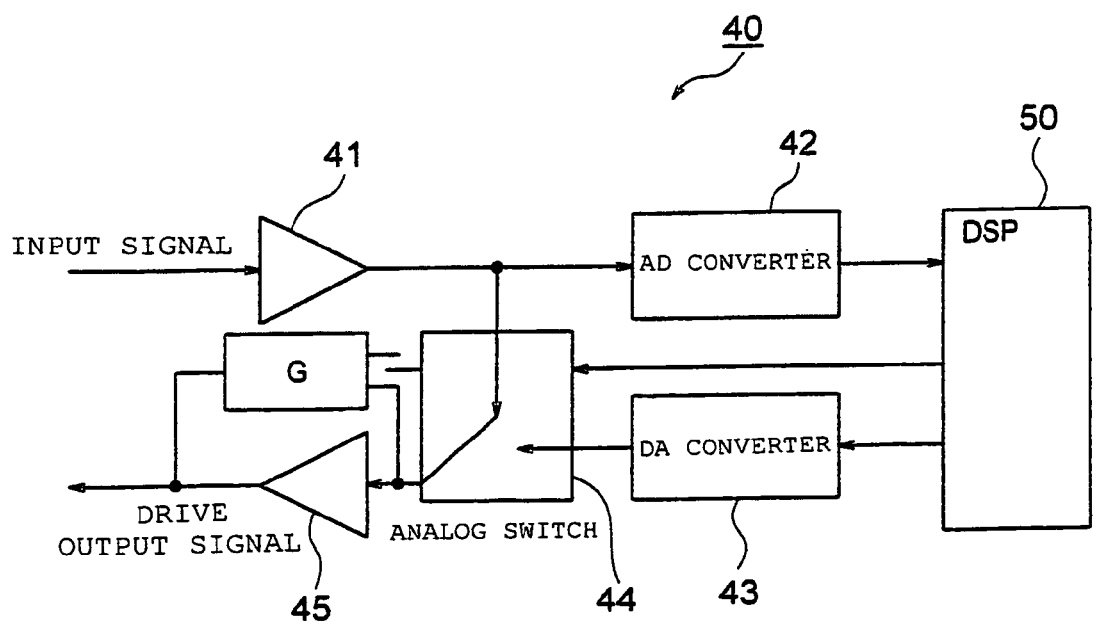
FIG. 2 is a block diagram illustrating a drive circuit of a Coriolis flowmeter based on a principle of the PLL illustrated in FIG. 1.

FIG. 2 is a block diagram illustrating a drive circuit of a Coriolis flowmeter based on a principle of the PLL 30.

In FIG. 2, a drive circuit 40 includes an operational (OP) amplifier 41, an A/D converter 42, a D/A converter 43, and an analog switch 44.

When a pair of flow tubes included in a measurement tube are opposed to each other and an electromagnetic oscillator is operated by a driving device to alternately drive the flow tubes in a rotating direction, a drive output signal for vibrating the pair of flow tubes is obtained from a structure in which the analog switch 44 switches between two signals, that is, an output signal from the D/A converter 43 and an input signal output from the OP amplifier 41 after a phase difference and/or a vibration frequency proportional to Coriolis force generated on the pair of flow tubes are/is detected by an electromagnetic pick-off in the case where the flow tubes are alternately driven in the rotating direction, to thereby be able to output a switched signal to a drive output amplifier 45.

The analog switch 44 has a circuit structure so that a gain of the drive output operational (OP) amplifier 45 is switched simultaneously with the switching of the analog switch 44.

The output signal from the A/D converter 42 is input to a digital signal processor (DSP) 50 connected to the A/D converter 42.

Figure 3:
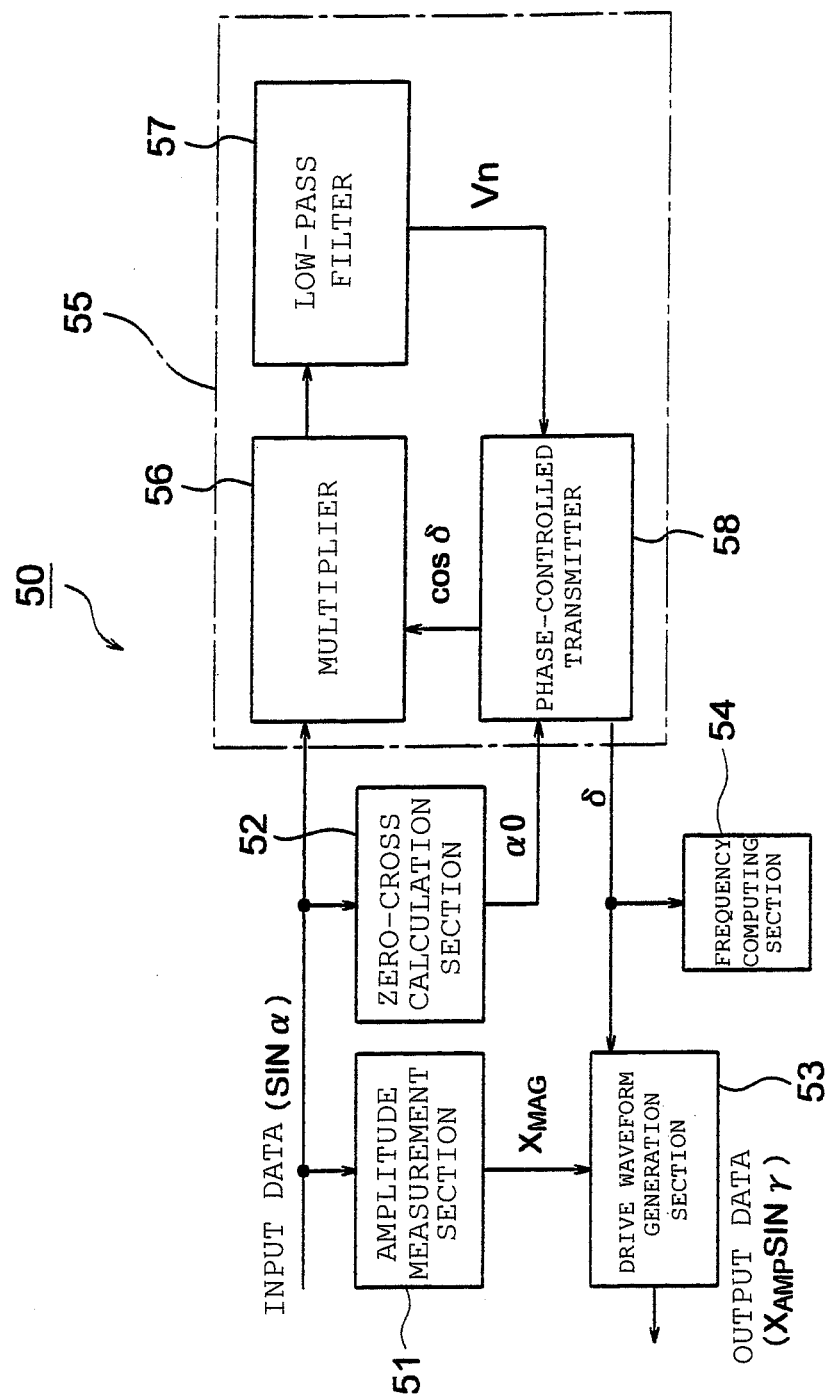
FIG. 3 is a block diagram illustrating the drive circuit of the Coriolis flowmeter based on a principle of a digital signal processor (DSP).

FIG. 3 is a block diagram illustrating a drive circuit of a Coriolis flowmeter based on a principle of the digital signal processor (DSP) 50.

The digital signal processor (DSP) 50 is a microprocessor specific to digital signal processing.

Next, an internal structure of the DSP 50 is described. The DSP 50 includes an amplitude measurement section 51, a zero-cross calculation section 52, a drive waveform generation section 53, a frequency computing section 54, and a PLL 55 (multiplier 56, low-pass filter 57, and phase-controlled transmitter 58).

The respective constituent elements included in the DSP 50 are described below.

(1) Amplitude Measurement Section 51

The amplitude measurement section 51 performs amplitude calculation. In the amplitude calculation, a spectral strength at a resonance frequency which is obtained by a FFT is used as an amplitude value for internal computation of the amplitude measurement section 51.

(2) Zero-Cross Calculation Section 52

The zero-cross calculation section 52 measures the number of changes per unit time of a sign bit of input data (sin α) output from the A/D converter 42, indicating the phase difference and/or the vibration frequency proportional to the Coriolis force generated on the pair of flow tubes which are/is detected by the electromagnetic pick-off in the case where the flow tubes are alternately driven in the rotating direction. The zero-cross calculation section 52 sends a measured value as zero-cross data to the phase-controlled transmitter 58.

(3) Drive Waveform Generation Section 53,

The drive waveform generation section 53 determines a phase of an output waveform based on phase data 5 output from the phase-controlled transmitter 58. The drive waveform generation section 53 also determines an amplitude of the output waveform based on amplitude data $X_{MAG}$ output from the amplitude measurement section 51. Then, the drive waveform generation section 53 generates the output waveform output therefrom.

(4) Frequency Computing Section 54

The frequency computing section 54 calculates the vibration frequency proportional to the Coriolis force, which is detected by the electromagnetic pick-off, based on the phase data 6 output from the phase-controlled transmitter 58.

(5) Multiplier 56

In the multiplier 56, the input data (sing) obtained by converting, into a digital signal, by the A/D converter 42, a signal obtained by amplifying, by the OP amplifier 41, the phase difference and/or the vibration frequency proportional to the Coriolis force generated on the pair of flow tubes, which are/is detected by the electromagnetic pick-off in the case where the flow tubes are alternately driven in the rotating direction, is compared in phase with an output signal cos δ output from the phase-controlled transmitter 58, and a difference signal and a sum signal are output to the low-pass filter 57.

(6) Low-Pass Filter 57

The low-pass filter 57 is a circuit for extracting only a lower-frequency signal from the output signals output from the multiplier 56 through a frequency filter.

Therefore, only a difference component is extracted from the output signals output from the multiplier 56.

(7) Phase-Controlled Transmitter 58

The phase-controlled transmitter 58 generates the phase data δ of the output waveform based on the zero-cross data ($\alpha_0$) output from the zero-cross section (zero-cross calculation section 52).

The phase-controlled transmitter 58 outputs the output signal cos δ to the multiplier 56. The multiplier 56 compares the phase of the input data (sin α) obtained as the digital signal by conversion by the A/D converter 42 with the phase of the output signal cos δ and outputs the difference signal and the sum signal to the low-pass filter 57. The low-pass filter 57 performs filtering to output only the difference component. The phase-controlled transmitter 58 calculates the phase data δ so that output data Vn of the difference component becomes 0, and then outputs the calculated phase data δ to the drive waveform generation section 53.

The drive waveform generation section 53 generates the waveform based on the phase data 6 output from the phase-controlled transmitter 58 and outputs the generated waveform as output data ($X_{AMP}$ sin γ) to the D/A converter 43.

Next, a drive start method for the digital signal processor (DSP) 50 is described.

In an initial state of the drive circuit 40, the pair of flow tubes which are opposed to each other and included in the measurement tube are not alternately driven by the electromagnetic oscillator. Therefore, the pair of flow tubes do not vibrate. Accordingly, the input signal is not input to the OP amplifier 41 of the drive circuit 40 and the output signal is not output from the OP amplifier 41 of the drive circuit 40, and hence the drive output signal is not output from the amplifier 45.

When the input signal which is output from the OP amplifier 41 and input to the A/D converter 42 is 0 (amplitude is 0), the gain of the output amplifier 45 is switched by the analog switch 44 illustrated in FIG. 2 and connection is made so that the input signal which is output from the OP amplifier 41 and input to the A/D converter 42 is directly input to the amplifier 45. Therefore, the input signal is output as the output signal from the amplifier 45, to thereby apply an initial vibration to a drive coil.

After an amplitude value of the input signal which is output from the OP amplifier 41 and input to the A/D converter 42 increases to a certain level, the analog switch 44 is returned to an original state. Therefore, the connection state in which the input signal which is output from the OP amplifier 41 and input to the A/D converter 42 is directly input to the amplifier 45 returns to the normal connection drive state.

Next, calculation methods for the respective constituent elements included in the DSP 50 are described.

(1) Amplitude Measurement Section

The phase difference and/or the vibration frequency proportional to the Coriolis force generated on the pair of flow tubes in the case where the flow tubes are alternately driven in the rotating direction are/is detected by the electromagnetic pick-off, amplified by the OP amplifier 41, and converted into the digital value by the A/D converter 42 to obtain the input data (sin α). In the amplitude measurement section 51, a real component and imaginary component of the input data are calculated by a fast Fourier transform (FFT) and the amplitude value $X_{MAG}$ is obtained from a power spectrum of the input signal by Expression (1).

[Expression 1]
$$X_{MAG} = \sqrt{Re^2 + Im^2} \tag{1}$$

In the amplitude calculation of the amplitude measurement section 51, the fast Fourier transform (FFT) is used to calculate the spectral strength at the resonance frequency, and the spectral strength is used as the amplitude value $X_{MAG}$ for the internal calculation of the amplitude measurement section 51.

(2) Zero-Cross

The phase difference and/or the vibration frequency proportional to the Coriolis force generated on the pair of flow tubes in the case where the flow tubes are alternately driven in the rotating direction are/is detected by the electromagnetic pick-off, amplified by the OP amplifier 41, and converted into the digital value by the A/D converter 42 to obtain the input data (sin α) signal. In the zero-cross measurement section 52, the number of changes within 0.5 sec of the sign bit of the input data signal is counted. Then, an approximate value of the input frequency of the signal output from the A/D converter 42 is obtained. The value obtained by the zero-cross measurement section 52 is sent to the phase-controlled transmitter 58 as the phase ($\alpha_0$) which is calculated based on the zero-cross data and used as a base.

The zero-cross measurement time is not limited to 0.5 sec and may be, for example, 1 sec.

(3) Multiplier 56

The phase difference and/or the vibration frequency proportional to the Coriolis force generated on the pair of flow tubes in the case where the flow tubes are alternately driven in the rotating direction are/is detected by the electromagnetic pick-off, amplified by the OP amplifier 41, and converted into the digital value by the A/D converter 42 to obtain the input data (sin α) signal. In the multiplier 56 of the PLL 55, the input data signal is multiplied by the output waveform of the output signal output from the phase-controlled transmitter 58.

When the output of the phase-controlled transmitter is denoted by cos δ, the computation (sin α·cos δ) of the multiplier 56 is expressed as follows.

[Expression 2]
$$\sin\alpha \cdot \cos\delta = \frac{1}{2}(\sin(\alpha+\delta) + \sin(\alpha-\delta)) \tag{2}$$

(4) Low-Pass Filter 57

Next, in the low-pass filter 57, the output data output from the multiplier 56 is filtered by a low-pass filter of the low-pass filter 57 to extract only the low-frequency component. When ½ which is the coefficient of Expression (2) is omitted based on the assumption that the high-frequency component in Expression (2) is completely removed by the low-pass filter, the output Vn from the low-pass filter of the low-pass filter 57 is as follows.

[Expression 3]

$$Vn = \sin(\alpha - \delta) \qquad (3)$$

When "$(\alpha - \delta)$" in Expression (3) is assumed as a sufficiently small value, the output Vn from the low-pass filter of the low-pass filter 57 may be approximately expressed as follows.

[Expression 4]

$$Vn = \alpha - \delta \qquad (4)$$

Therefore, when the output waveform $\cos \delta$ of the output signal output from the phase-controlled transmitter 58 is controlled to repeat the computation, the output Vn becomes Vn≈0. The phase data $\delta$ of the fundamental output waveform which is a result obtained by computation by the phase-controlled transmitter 58 is finally as follows.

[Expression 5]

$$\delta = \alpha \qquad (5)$$

When the computation as described above is performed, the phase $\delta$ of the output signal having the same phase as the input signal phase $\alpha$ may be calculated.

(5) Phase-Controlled Transmitter 58

In the phase-controlled transmitter 58, when the transmission frequency is changed based on the output signal Vin output from the low-pass filter 57, the input frequency and the output frequency of the phase-controlled transmitter become the same phase as described above because of the condition of Expression (4) which is the approximate expression from Expression (3). However, under a condition in which phase control is not established, for example, in an initial control state in which phase matching cannot be achieved or an antilock state, it is necessary to increase a locking time.

In such cases, the value of the output signal Vn output from the low-pass filter 57 is set as $V_{n=1} = 0$, a base phase control transmission output is calculated from the phase $\alpha_0$ as the base based on the result obtained by measurement by the zero-cross measurement section 52, and the transmission frequency of the phase-controlled transmitter is determined based on the output result of the low-pass filter 57 as described in Expression (6).

In the drive waveform generation section 53, when the phase data $\delta$ output from the phase-controlled transmitter 58 is generated, the phase data $\delta$ is calculated as follows.

[Expression 6]

$$\delta = \alpha_0 + Vn \qquad (6)$$

A transmission waveform is generated by applying a sine function based on the phase data $\delta$ obtained from Expression (6) and shifted by $\pi/2$. Therefore, the output from the phase-controlled transmitter 58 may be obtained as follows.

[Expression 7]

$$\sin(\delta + \pi/2) = \cos \delta \qquad (7)$$

The output $\cos \delta$ obtained from Expression (7) is input to the multiplier described above.

(6) Drive Waveform Generation Section 53

The phase information $\delta$ output from the phase-controlled transmitter 58 and the amplitude value $X_{AMP}$ of the output signal output from the drive waveform generation section 53 are generated as a function of the output data $X_{MAG}$ from the amplitude measurement section 51 as follows.

[Expression 8]

$$X_{AMP} = Fx(X_{MAG}) \qquad (8)$$

Similarly, a phase $\gamma$ of the output signal output from the drive waveform generation section 53 may be expressed as a function of $\delta$ obtained by Expression (9).

[Expression 9]

$$\gamma = Fa(\delta) \qquad (9)$$

Therefore, the drive signal $\gamma$ output from the drive waveform generation section 53 is expressed as follows.

[Expression 10]

$$X_{AMP} \cdot \sin \gamma \qquad (10)$$

Note that Fx and Fa indicate a function for generating the amplitude of the output waveform, and a function for generating the phase thereof, respectively.

The function Fx of Expression (8) and the function Fa of Expression (9) are changed depending on a diameter or type of a Coriolis detector.

For example, when a drive waveform is generated, in which a target amplitude value of an input waveform is "Z" and a phase thereof is shifted by $\pi$ (rad), the function Fx of Expression (8) and the function Fa of Expression (9) are as follows.

[Expression 11]

$$Fx = Z - X_{MAG}, \; Fa = \delta + \pi \qquad (11)$$

(7) Frequency Computing Section 54

The phase data $\delta$ of the output signal output from the phase-controlled transmitter 58 may be expressed as follows.

[Expression 12]

$$\delta = 2 \cdot \pi \cdot f \cdot t \qquad (12)$$

where
$\pi$: pi
f: drive frequency
t: sampling rate

Thus, when the phase data 5 of the output signal output from the phase-controlled transmitter 58 illustrated in FIG. 3 is divided by $2\pi \cdot t$, the frequency "f" may be obtained as described in Expression (13).

[Expression 13]

$$f = \frac{\delta}{2 \cdot \pi \cdot t} \qquad (13)$$

When the value of the frequency "f" obtained from Expression (13) is used as the drive frequency, sensor tube resonance vibration driving which has high response, is very stable, and has high Q may be provided.

Next, synchronous feedback and frequency computing processing of the DSP 50 are described with reference to a flow chart illustrated in FIG. 4.

Figure 4:
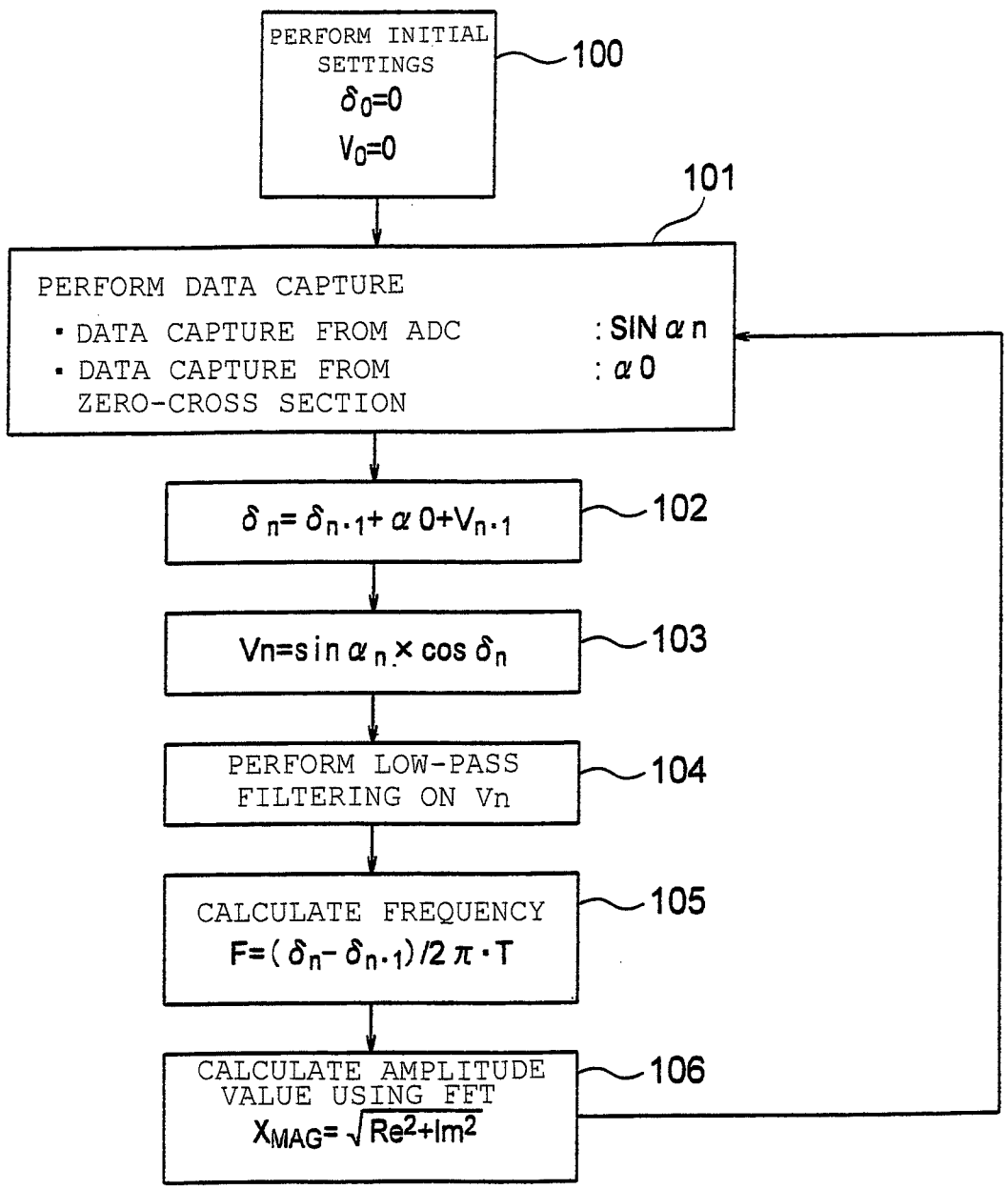
FIG. 4 is a flow chart illustrating synchronization feedback and frequency computation.

In FIG. 4, in Step 100, initial settings of the phase data 6 output from the phase-controlled transmitter 58 of the PLL 55 and the output signal Vn output from the low-pass filter 57 of the PLL 55 are performed ($\delta_0 = 0$ and $V_0 = 0$).

In Step 101, the data output from the A/D converter 42 is captured and the initial phase $\alpha_0$ is computed as the base by the zero-cross measurement section 52 based on the value of the captured data from the A/D converter 42.

After the initial settings ($\delta_0$=0 and $V_0$=0) are performed in Step 100, in Step 101, the input data (sin α) which is amplified by the OP amplifier 41 and converted into the digital value by the A/D converter 42 is captured to the multiplier 56 of the PLL 55, and the phase data $\alpha_0$ output from the zero-cross measurement section 52 is captured to the phase-controlled transmitter 58 of the PLL 55.

When the input data (sin α) and the phase data $\alpha_0$ are captured in Step 101, in Step 102, phase data $\delta_n$ output from the phase-controlled transmitter 58 is obtained by the following computation $$\delta_n = \delta_{n-1} + \alpha_0 + V_{n-1}$$

based on the initial phase $\alpha_o$, an initial set value $\delta_{n-1}$ of the phase data δ, and an initial set value $V_{n-1}$ of the output signal V output from the low-pass filter 57 of the PLL 55.

When the phase data $\delta_n$ output from the phase-controlled transmitter 58 is computed in Step 102, in Step 103, the phase of the output signal cos $\delta_n$ which is output from the phase-controlled transmitter 58 to the multiplier 56 is computed based on the initial phase $\alpha_0$, the initial set value $\delta_{n-1}$ of the phase data δ, and the initial set value $V_{n-1}$ of the output signal V output from the low-pass filter 57 of the PLL 55. The computed output signal cos $\delta_n$ is multiplied as follows by the input data sin $\alpha_n$ which has converted into the digital value by the A/D converter 42 to obtain the output signal Vn from the low-pass filter 57.

$$Vn = \sin \alpha_n \times \cos \delta_n$$

When the output signal Vn from the low-pass filter 57 is obtained in Step 103, in Step 104, the output signal Vn which is actually output from the low-pass filter 57 through a low-pass filter is obtained.

That is, in the low-pass filter 57, the output data output from the multiplier 56 is filtered through the low-pass filter to extract only the low-frequency component as the output signal Vn output from the A/D converter 42.

When the output signal Vn which is actually output from the low-pass filter 57 through the low-pass filter is obtained in Step 104, in Step 105, frequency computation is performed based on the value $\delta_n$ for phase comparison computation.

That is, in Step 105, the phase data δ output from the phase-controlled transmitter 58 is divided by 2π·t by the frequency computing section 54 to obtain the frequency "F" as follows.

$$F = (\delta_n - \delta_{n-1})/2\pi \cdot t$$

Therefore, when the frequency "F" is computed based on the value $\delta_n$ for phase comparison computation, very high-speed computation may be achieved.

When the frequency computation is performed based on the value $\delta_n$ for phase comparison computation in Step 105, in Step 106, an amplitude value $X_{MAG}$ of a signal input to the frequency computing section 54 at the time of calculation of the frequency "F" is computed.

That is, the amplitude value $X_{MAG}$ of the input signal at the time of calculation of the frequency "F" is computed by the frequency computing section 54, and hence whether or not period matching is accurately achieved may be determined based on the amplitude value $X_{MAG}$ of the input signal.

The amplitude value $X_{MAG}$ of the input signal at the time of calculation of the frequency "F" is computed using a fast Fierier transform (FFT). However, even when the input waveform is moving-averaged, the same effect may be obtained.

When the amplitude value $X_{MAG}$ of the signal input to the frequency computing section 54 at the time of calculation of the frequency "F" is computed in Step 106, processing returns to Step 101. When computations from Step 101 to Step 106 are repeated, more accurate and high-speed frequency computation may be achieved.

In the synchronous feedback and frequency computing processing of the DSP 50, when loop calculation for maintenance is repeated as illustrated in FIG. 4, the frequency (phase) converges to the input frequency.

When the drive frequency is not locked to or does not converge to a frequency different from the input frequency, a result obtained by amplitude value calculation is very small. Therefore, whether or not the phase is locked may be determined based on the result obtained by amplitude value calculation.

Next, drive control processing is described with reference to a flow chart illustrated in FIG. 5.

Figure 5:
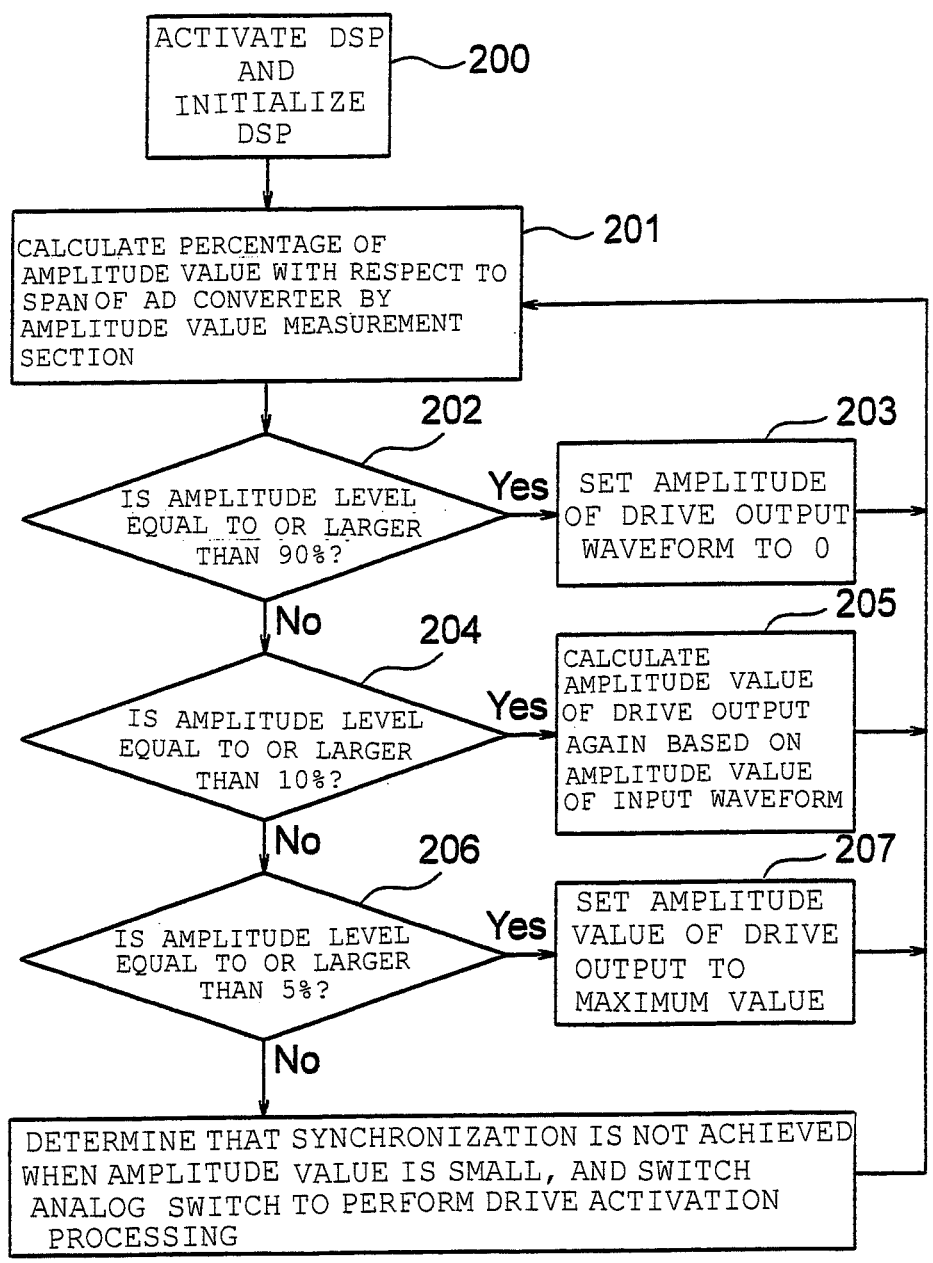
FIG. 5 is a flow chart illustrating drive control.
Figure 6:
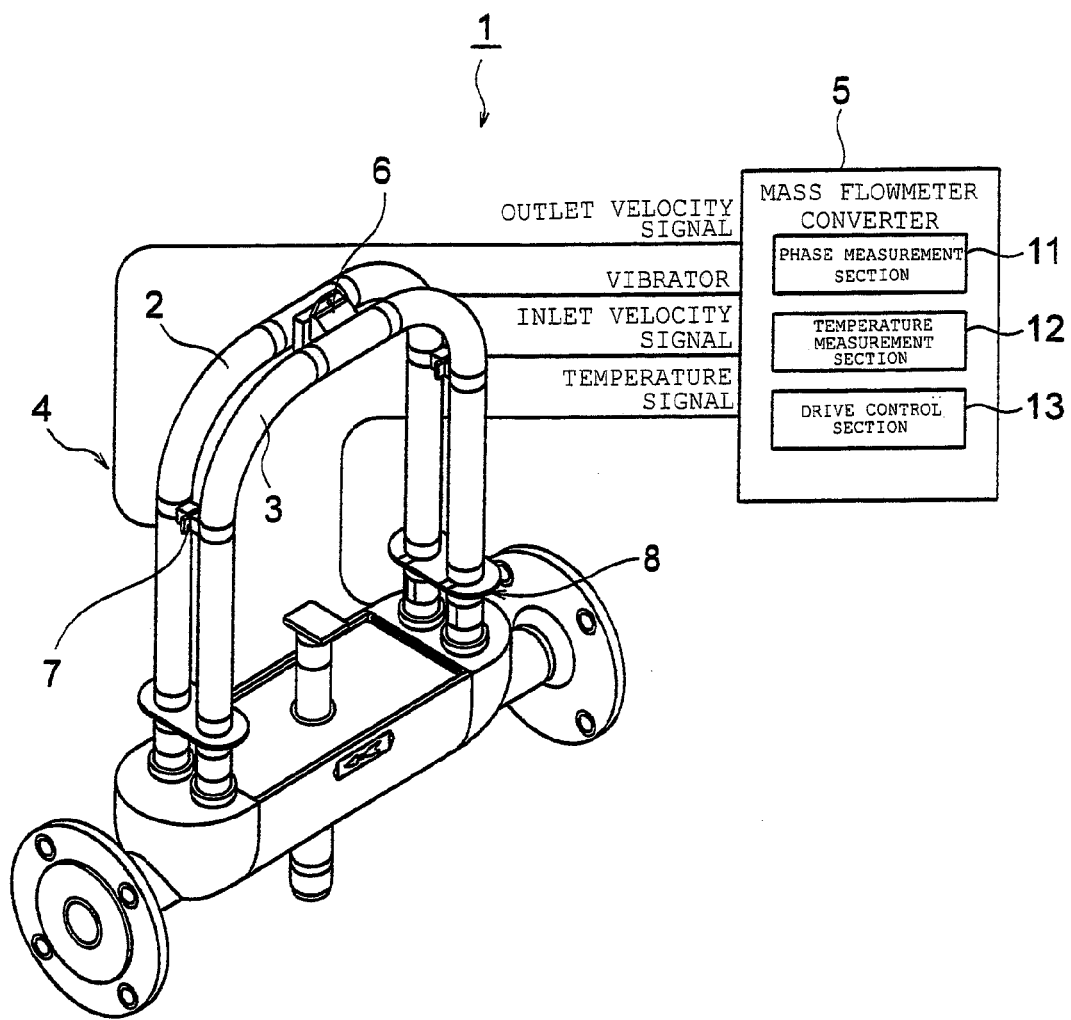
FIG. 6 is a structural diagram illustrating a general Coriolis flowmeter to which the present invention is applied.
Figure 7:
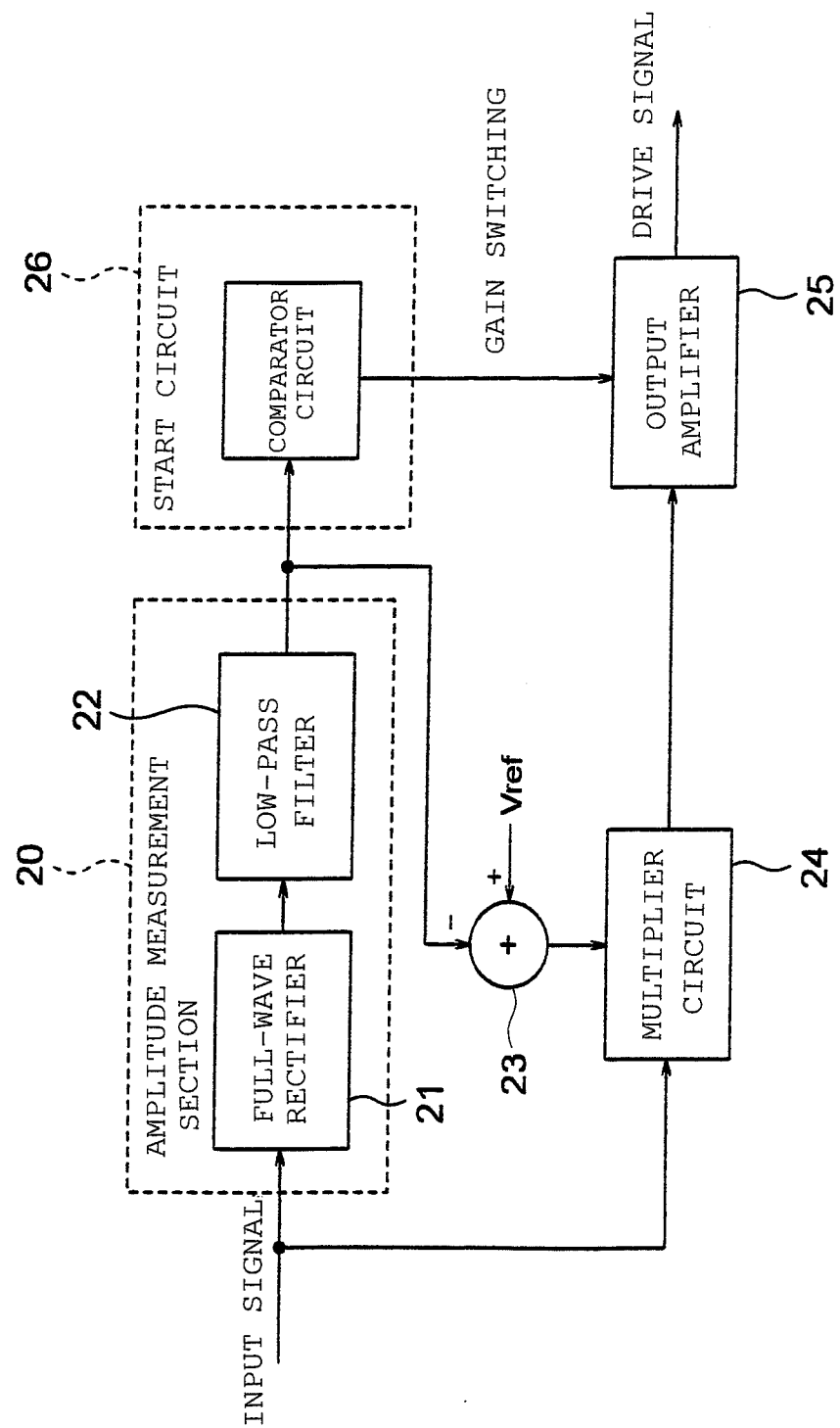
FIG. 7 is an explanatory diagram illustrating an operation principle of a drive circuit of the Coriolis flowmeter illustrated in FIG. 6.

In FIG. 5, in Step 200, the digital signal processor (DSP) 50 is activated and the DSP 50 is initialized, that is, the initial settings of the phase data 5 output from the phase-controlled transmitter 58 of the PLL 55 and the output signal Vn output from the low-pass filter 57 of the PLL 55 are performed ($\delta_0$=0 and $V_0$=0).

After the initialization is performed in Step 200, in Step 201, the input data (sin α) which has converted into the digital value by the A/D converter 42 is input to the amplitude measurement section 51 of the DSP 50 to compute the percentage of the amplitude value with respect to a span of the A/D converter 42.

That is, the phase difference and/or the vibration frequency proportional to the Coriolis force generated on the pair of flow tubes in the case where the flow tubes are alternately driven in the rotating direction are/is detected by the electromagnetic pick-off, amplified by the OP amplifier 41, and converted into the digital value by the A/D converter 42 to obtain the input data (sin α). In the amplitude measurement section 51, the real component and the imaginary component of the input data are calculated by a fast Fourier transform (FFT) to obtain the power spectrum of the input signal which is converted into the digital value by the A/D converter 42.

In Step 201, the input data (sin α) which has converted into the digital value by the A/D converter 42 is input to the amplitude measurement section 51 of the DSP 50 to compute the percentage of the amplitude value $X_{MAG}$ of the input data (sin α) with respect to the span of the A/D converter 42.

When the percentage of the amplitude value $X_{MAG}$ of the input data (sin α) which is input to the amplitude measurement section 51 of the DSP 50 with respect to the span of the A/D converter 42 is computed in Step 201, in Step 202, whether or not the percentage of the amplitude value $X_{MAG}$ of the input data (sin α) with respect to the span of the A/D converter 42 is equal to or larger than 90% is determined.

When it is determined in Step 202 that the percentage of the amplitude value $X_{MAG}$ of the input data (sin α) which is input to the amplitude measurement section 51 of the DSP 50 with respect to the span of the A/D converter 42 is equal to or larger than 90%, in Step 203, the amplitude value $X_{AMP}$ output from the drive waveform generation section 53 is set to 0.

That is, the drive waveform generation section 53 determines the amplitude of the output signal ($X_{AMP}$ sin γ) based on the amplitude value $X_{MAG}$ input from the amplitude measurement section 51 and generates the output signal ($X_{AMP}$ sin γ) which is output from the drive waveform generation section 53.

When it is determined in Step 202 that the percentage of the amplitude value $X_{MAG}$ of the input data (sin α) which is input to the amplitude measurement section 51 of the DSP 50 with respect to the span of the A/D converter 42 is equal to or larger than 90% and when the amplitude value $X_{AMP}$ output from the drive waveform generation section 53 is set to 0 in Step 203, processing proceeds to Step 201.

When it is determined in Step 204 that the percentage of the amplitude value $X_{MAG}$ of the input data (sin α) which is input to the amplitude measurement section 51 of the DSP 50 with respect to the span of the A/D converter 42 is equal to or larger than 10%, in Step 205, the amplitude value $X_{AMP}$ output from the drive waveform generation section 53 is determined by computation based on the amplitude value $X_{MAG}$ of the input waveform (sin α) which has converted into the digital value by the A/D converter 42.

That is, the drive waveform generation section 53 determines the amplitude of the output signal ($X_{AMP}$ sin γ) based on the amplitude value $X_{MAG}$ of the input waveform (sin α) which has converted into the digital value by the A/D converter 42 and input from the amplitude measurement section 51, and generates the output signal ($X_{AMP}$ sin γ) which is output from the drive waveform generation section 53.

When it is determined in Step 204 that the percentage of the amplitude value $X_{MAG}$ of the input data (sin α) which is input to the amplitude measurement section 51 of the DSP 50 with respect to the span of the A/D converter 42 is equal to or larger than 10% and when the amplitude value $X_{AMP}$ output from the drive waveform generation section 53 is computed based on the amplitude value $X_{MAG}$ of the input waveform (sin α) which has converted into the digital value by the A/D converter 42 in Step 205, processing proceeds to Step 201.

In addition, when it is determined in Step 206 that the percentage of the amplitude value $X_{MAG}$ of the input data (sin α) which is input to the amplitude measurement section 51 of the DSP 50 with respect to the span of the A/D converter 42 is equal to or larger than 5%, in Step 207, the amplitude value $X_{AMP}$ output from the drive waveform generation section 53 is set to a maximum value.

That is, the drive waveform generation section 53 determines the amplitude of the output signal ($X_{AMP}$ sin γ) based on the amplitude value $X_{MAG}$ input from the amplitude measurement section 51 and generates the output signal ($X_{AMP}$ sin γ) which is output from the drive waveform generation section 53.

When it is determined in Step 206 that the percentage of the amplitude value $X_{MAG}$ of the input data (sin α) which is input to the amplitude measurement section 51 of the DSP 50 with respect to the span of the A/D converter 42 is equal to or larger than 5% and when the amplitude value $X_{AMP}$ output from the drive waveform generation section 53 is set to the maximum value in Step 207, processing proceeds to Step 201.

In Step 208, when the amplitude value $X_{MAG}$ of the input waveform (sin α) which is converted into the digital value by the A/D converter 42 is small, it is determined that synchronization is not achieved. Then, the analog switch 44 of the drive circuit 40 is switched for activation processing.

In this way, when the percentage of the amplitude width of the input waveform (sin α) which is converted into the digital value by the A/D converter 42 and is input to the DSP 50 with respect to the span of the A/D converter 42 is equal to or larger than 90%, it is likely to saturate the input, and hence the amplitude value of the drive output is reduced. When a level of the input amplitude is smaller than 10% and equal to or larger than 5%, the amplitude width of the drive output is increased. When the value is further smaller (when level of input amplitude is smaller than 5%, it is determined that no signal is input, and then activation processing is performed.

In FIG. 5, the amplitude determination for the amplitude value is performed based on 90%, 10%, and 5%, but this is a specific example. The determination condition is suitably selected depending on the system structure and required conditions.

With respect to the calculation of the amplitude value of the drive output signal which is output from the drive waveform generation section 53, a difference between the target value (set value) and the amplitude value of the input waveform is obtained and the drive waveform is calculated based on the difference. The drive output is controlled so that the amplitude value of the input waveform becomes the target value.

When the synchronization of the feedback system is not achieved as described above, the frequency measurement is unstable and the measured amplitude value is substantially 0. Hence, processing enters the activation processing.

Next, a feature of the driving method based on the control method according to the present invention and a feature of the frequency measurement method are described.

<Feature of Driving Method>

The most distinctive feature of the driving method according to the present invention is that phase synchronization capability is high and noise resistance is high.

The entire control system related to structures and functions is incorporated into the inner portion of the DSP, and hence there is an advantage that a very compact structure may be provided and the internal parameters (Fx, Fa) of the DSP may be changed to use various sensors.

<Feature of Frequency Measurement>

The feature of the frequency measurement method is that very high-speed calculation may be achieved because processing which is inconvenient and has an increased number of program steps, for example, a Hilbert transform (90°-shift computation) or $TAN^{-1}$ calculation, may be eliminated, and the noise resistance is high because of the use of the low-pass filter as also described in the feature of the driving method.

As described above, with this system, the calculation speed may be significantly increased, and hence the feedback loop is always synchronized and the computation progresses. Therefore, the frequency measurement converges to the limit and is thus stable.

For example, a capability of 1 msec which is extremely shorter than approximately 100 msec required for normal measurement may be obtained.

The control function may be digitally-represented. Therefore, a strategy for drive diagnosis or self diagnosis is provided, and hence currently desired customer needs may be satisfied. This is a significant point of view and produces a maximum advantage.

The invention claimed is:

1. A driving device for a Coriolis flowmeter having a structure in which a pair of flow tubes constituting measurement tubes are opposed to each other, an electromagnetic oscillator is operated by the driving device to alternately drive the flow tubes in a rotation direction, and an electromagnetic pick-off detects a phase difference and/or a vibration frequency proportional to a Coriolis force acting on the pair of flow tubes when the pair of flow tubes are vibrated, to thereby obtain a mass flow rate and/or density of a fluid to be measured, the driving device comprising:
    an operational (OP) amplifier for amplifying an analog input signal from the electromagnetic pick-off;
    an analog to digital (A/D) converter for converting an analog signal output from the OP amplifier into a digital signal;

a digital signal processor (DSP) for performing digital processing on the digital signal output from the A/D converter based on phase detection; and a digital to analog (D/A) converter for converting a digital signal having a processed data amount output from the digital signal processor (DSP) into an analog signal, wherein the digital signal processor (DSP) comprises:

an amplitude measurement section for amplitude-calculating using a fast Fourier transform a spectral strength at a resonance frequency, as an amplitude value, from the digital signal output from the A/D converter;

a zero-cross calculation section for measuring a number of changes per unit time of a sign bit of the digital signal output from the A/D converter, and outputting a measured value as zero-cross data;

a phase-locked loop (PLL) for performing the phase detection based on the zero-cross data and the digital signal output from the A/D converter;

a drive waveform generation section for generating an output waveform, as the digital signal having the processed data amount, by determining an amplitude of the output waveform based on an output from the phase-locked loop (PLL) and amplitude data from the amplitude measurement section; and a frequency computing section for calculating a frequency based on phase data output from the phase-locked loop (PLL).

2. A driving device for a Coriolis flowmeter according to claim 1, wherein the phase-locked loop (PLL) generates a drive signal for driving a coil at a transmission frequency synchronized with an input signal based on a transmission frequency obtained by the phase detection and based on the digital signal output from the A/D converter.

3. A driving device for a Coriolis flowmeter according to claim 1, wherein:

the phase-locked loop (PLL) comprises:
a multiplier;
a low-pass filter; and
a phase-controlled transmitter;

the multiplier compares a phase of the digital signal output from the A/D converter with a phase of a digital output signal output from the phase-controlled transmitter, and outputs a difference signal and a sum signal therebetween;

the low-pass filter extracts only a low-frequency signal from an output signal from the multiplier; and the phase-controlled transmitter generates phase data of a fundamental output waveform based on the zero-cross data from the zero-cross calculation section, computes a phase so that output data from the low-pass filter becomes 0, and generates and outputs a waveform based on the computed phase.

4. A driving device for a Coriolis flowmeter according to claim 2, wherein:

the phase-locked loop (PLL) comprises:
a multiplier;
a low-pass filter; and
a phase-controlled transmitter;

the multiplier compares a phase of the digital signal output from the A/D converter with a phase of a digital output signal output from the phase-controlled transmitter, and outputs a difference signal and a sum signal therebetween;

the low-pass filter extracts only a low-frequency signal from an output signal from the multiplier; and the phase-controlled transmitter generates phase data of a fundamental output waveform based on the zero-cross data from the zero-cross calculation section, computes a phase so that output data from the low-pass filter becomes 0, and generates and outputs a waveform based on the computed phase.

5. A driving device for a Coriolis flowmeter according to claim 1, further comprising:

an analog switch for selectively outputting one of the analog signal output from the OP amplifier and the analog signal output from the D/A converter, wherein an output signal output from the analog switch is amplified by an output operational (OP) amplifier connected to an output terminal of the analog switch and output as a drive output signal; and a gain of the output OP amplifier is switched by the analog switch.

6. A driving device for a Coriolis flowmeter according to claim 2, further comprising:

an analog switch for selectively outputting one of the analog signal output from the OP amplifier and the analog signal output from the D/A converter, wherein an output signal output from the analog switch is amplified by an output operational (OP) amplifier connected to an output terminal of the analog switch and output as a drive output signal, and a gain of the output OP amplifier is switched by the analog switch.

7. A driving device for a Coriolis flowmeter according to claim 3, further comprising:

an analog switch for selectively outputting one of the analog signal output from the OP amplifier and the analog signal output from the D/A converter, wherein an output signal output from the analog switch is amplified by an output operational (OP) amplifier connected to an output terminal of the analog switch and output as a drive output signal; and a gain of the output OP amplifier is switched by the analog switch.

8. A driving device for a Coriolis flowmeter according to claim 4, further comprising:

an analog switch for selectively outputting one of the analog signal output from the OP amplifier and the analog signal output from the D/A converter, wherein an output signal output from the analog switch is amplified by an output operational (OP) amplifier connected to an output terminal of the analog switch and output as a drive output signal; and a gain of the output OP amplifier is switched by the analog switch.

* * * * *